Dec. 15, 1959     D. G. WOELFEL     2,917,308
HOUSING AND INTERCHANGEABLE MAGAZINE FOR ENDLESS FILM
Filed May 22, 1957     5 Sheets-Sheet 1
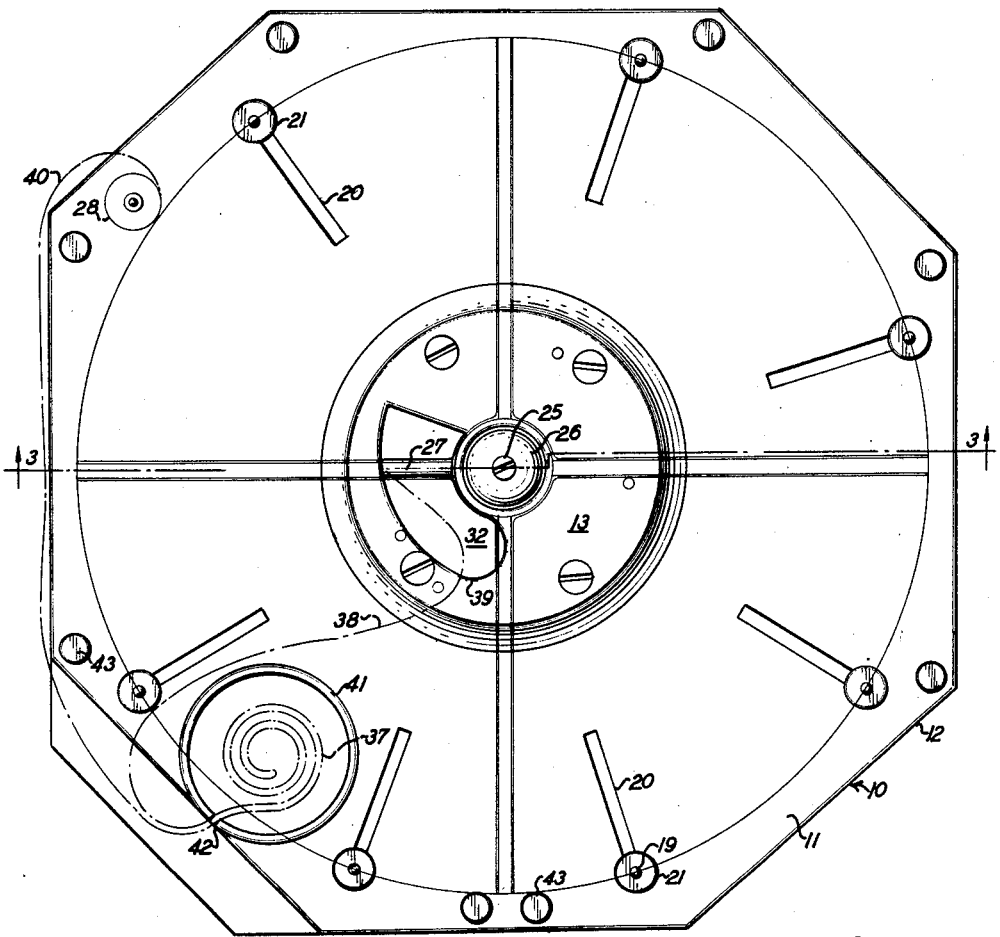
INVENTOR
DONALD G. WOELFEL
BY
Jacobi & Jacobi
ATTORNEYS

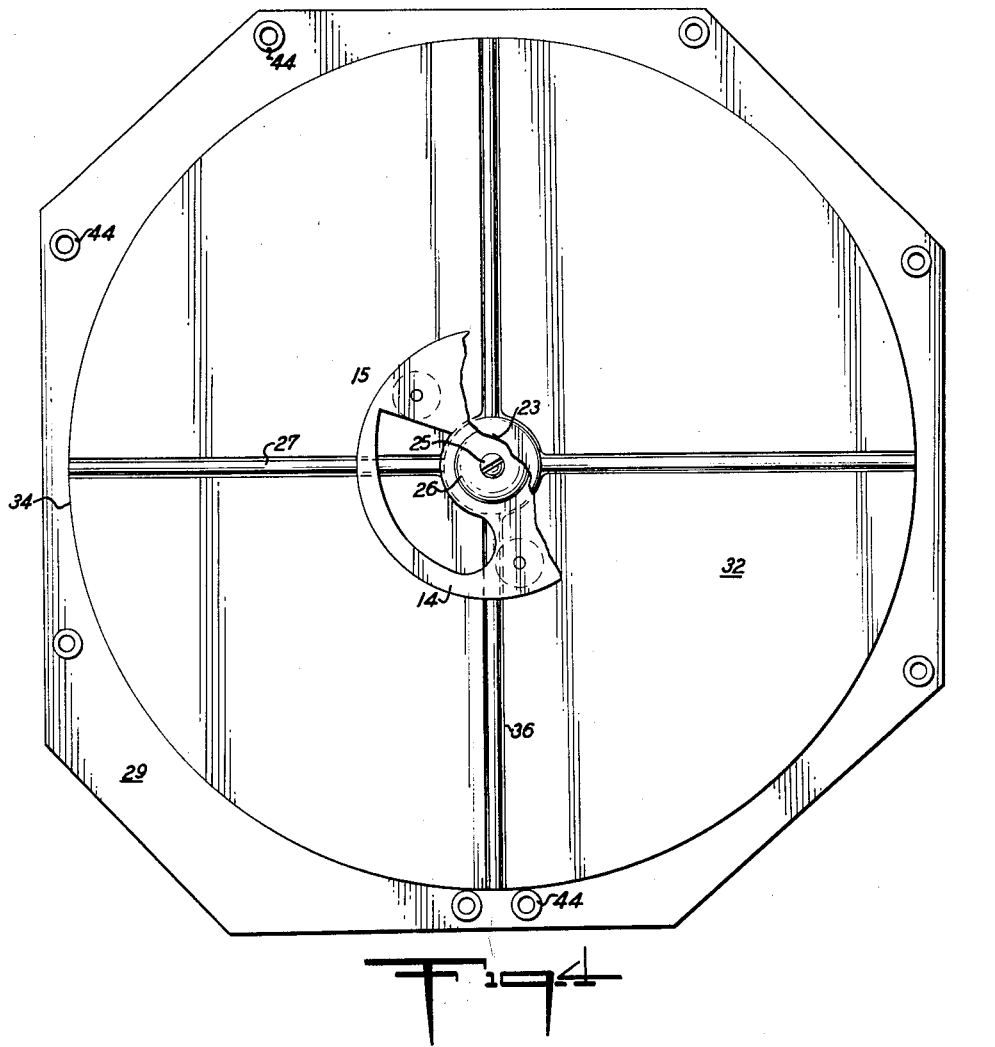
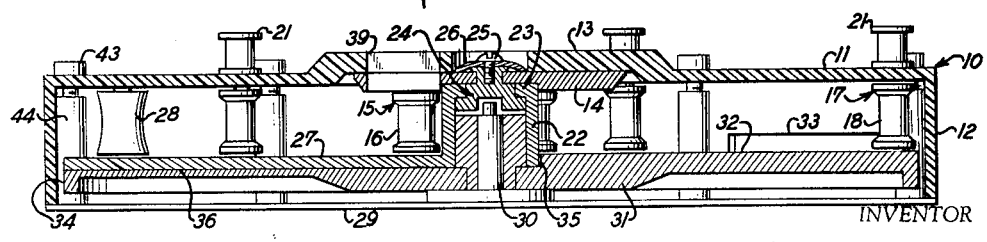

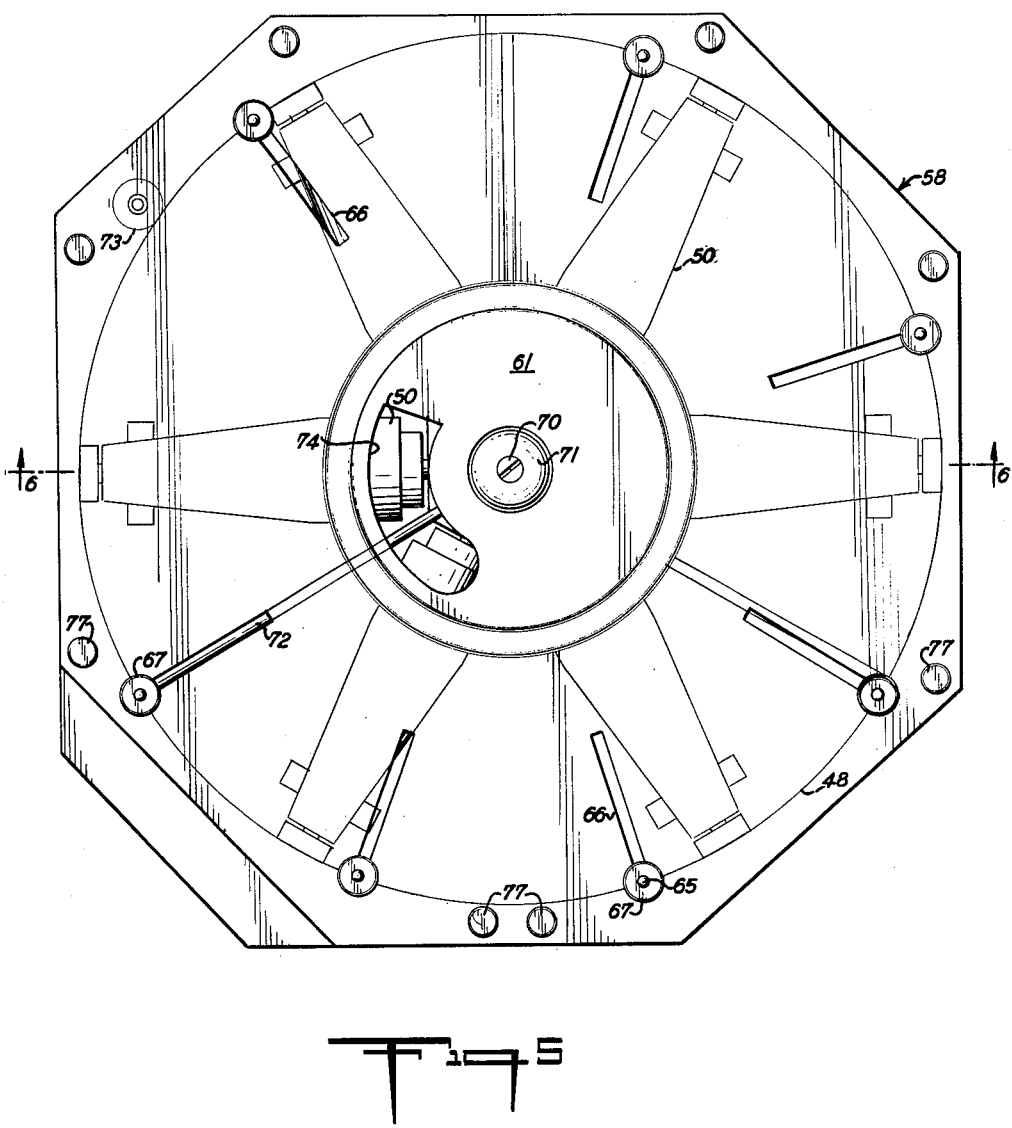

Dec. 15, 1959    D. G. WOELFEL    2,917,308
HOUSING AND INTERCHANGEABLE MAGAZINE FOR ENDLESS FILM
Filed May 22, 1957    5 Sheets-Sheet 4
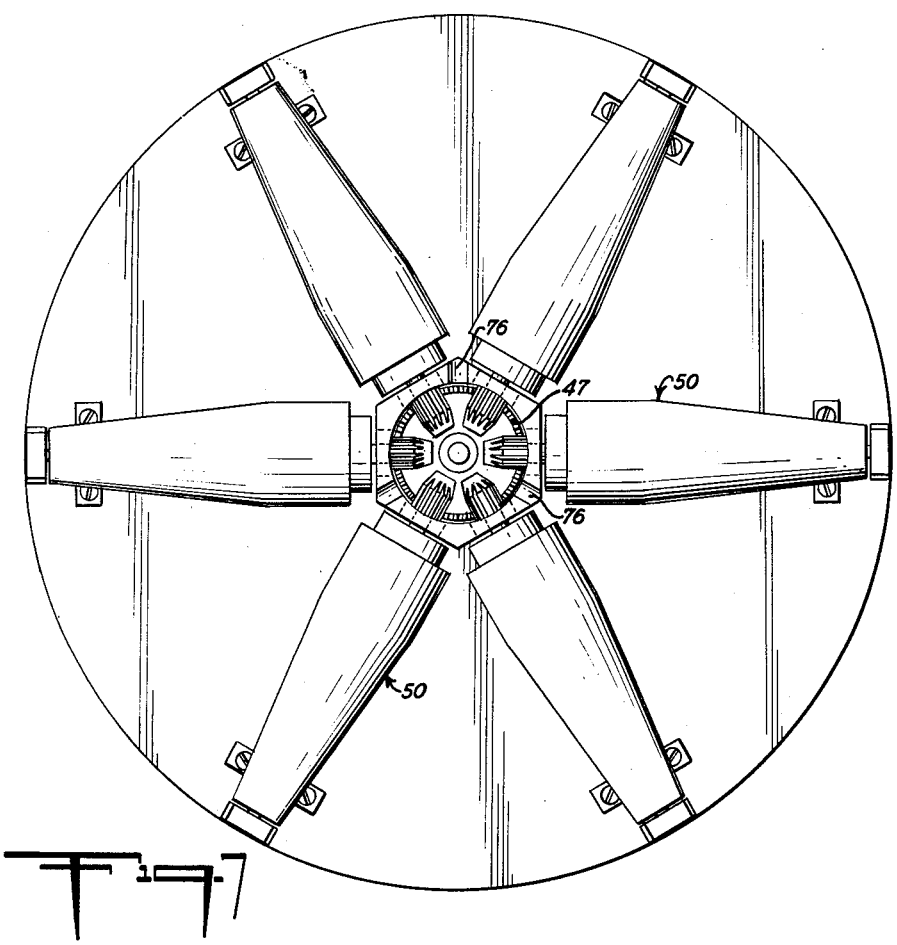
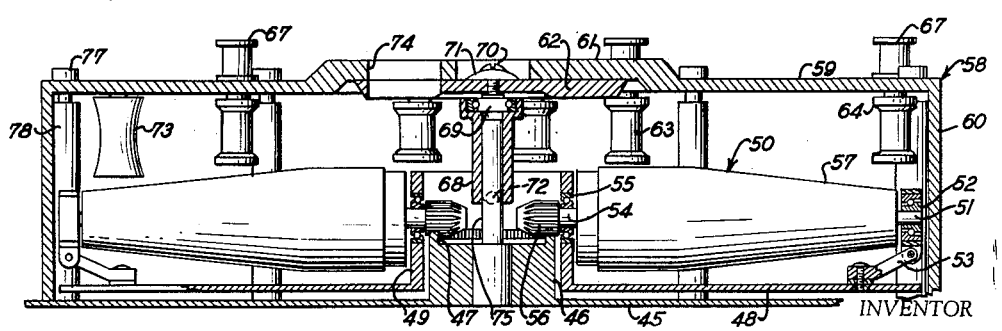
INVENTOR
DONALD G. WOELFEL
BY
Jacobi & Jacobi
ATTORNEYS Dec. 15, 1959 D. G. WOELFEL 2,917,308
HOUSING AND INTERCHANGEABLE MAGAZINE FOR ENDLESS FILM
Filed May 22, 1957 5 Sheets-Sheet 5
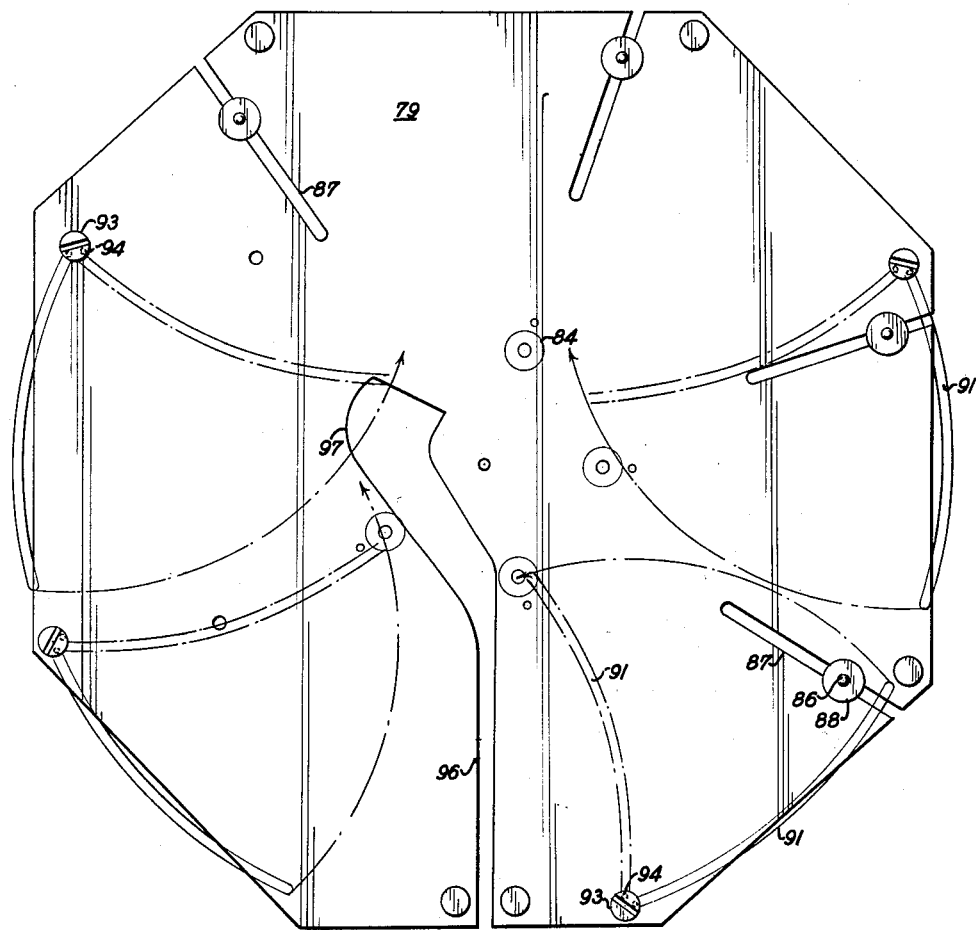
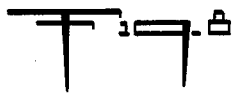
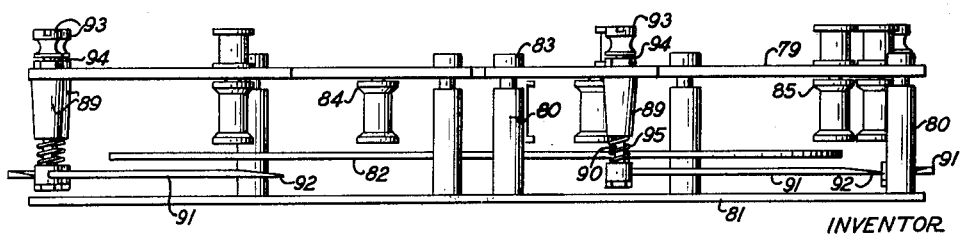
INVENTOR.
DONALD G. WOELFEL
BY
Jacobi & Jacobi
ATTORNEYS

United States Patent Office 2,917,308
Patented Dec. 15, 1959

2,917,308

HOUSING AND INTERCHANGEABLE MAGAZINE FOR ENDLESS FILM

Donald G. Woelfel, Yorktown Heights, N.Y.

Application May 22, 1957, Serial No. 660,966

5 Claims. (Cl. 271—2.18)

This invention relates to the handling and feeding of endless films, such as motion picture film or sound tape and more particularly to a housing and interchangeable magazine which may be utilized to store and transport film or tape and which may be conveniently installed in or removed from a motion picture projection apparatus or a sound recording and playback device.

Various types of motion picture apparatus and sound recording and playback devices in which the film or sound tape is supplied as an endless coil having a loop of such film or tape fed through the projection apparatus or the recording and playback head of the sound apparatus have heretofore been utilized, but many of these present serious problems in connection with storing and transporting the film or tape and in installing the same in the apparatus or removing the same therefrom. The installation and removal operation has required considerable skill and manual manipulation since it is necessary to use extreme care to prevent the coil of film or tape from collapsing and becoming a tangled mass which is exceedingly difficult to recoil in a proper manner for installation in the apparatus.

Motion picture projection and sound apparatus of this type are utilized for many purposes and are frequently utilized by salesmen or other persons desiring to present a subject pictorially in connection with sound or to simply play a sound tape for descriptive or other purposes and in the event the subject matter cannot be recorded on a single coil of film or tape, it becomes necessary to change the same and this has presented serious problems for the reasons mentioned above and particularly since the persons utilizing such equipment are not normally trained technicians and do not have the necessary skill or dexterity to successfully accomplish this operation.

Heretofore attempts have been made to provide magazines for endless film or tape of the type under consideration, but these prior art devices have also included the drive means for the tape or film which resulted in a relatively costly and heavy package and materially increased the operating costs, due to the fact that a large number of relatively expensive drive mechanisms must be supplied, whereas if the drive mechanism could remain a permanent part of the projection or sound apparatus and the film or tape supplied in an interchangeable magazine, the cost and weight would be materially reduced.

It is accordingly an object of this invention to provide a housing and interchangeable magazine for endless film or tape which may be utilized to store and transport such film or tape and which may be conveniently applied to or removed from the apparatus which the same is to be used.

A further object of the invention is the provision of a housing and interchangeable magazine for endless film or tape which may be conveniently and economically manufactured from readily available materials and which will serve to retain a coil of film or tape in formation and permit the convenient installation thereof in a projection or sound apparatus and also the removal therefrom for transportation or storage.

A still further object of the invention is the provision of a housing and interchangeable magazine for endless film or tape which may be utilized with existing motion picture projecting or sound recording and playback apparatus with only a slight modification thereof to accommodate the interchangeable magazine.

Another object of the invention is the provision of a housing and interchangeable magazine for endless film or tape which may be conveniently adjusted to accommodate coils of such film or tape of varying sizes.

Another object of the invention is the provision of a housing and interchangeable magazine for endless film or tape in which means is provided to accommodate and retain a loop of such film or tape to prevent damage thereto or becoming entangled with surrounding objects, but at the same time permitting convenient removal thereof for threading in the projecting apparatus or sound recording and playback device.

A still further object of the invention is the provision of an interchangeable magazine for endless film or tape which may be conveniently utilized with a motion picture projection apparatus or sound recording and playback device utilizing a turntable for supporting and feeding the film during operation.

Another object of the invention is the provision of a housing and interchangeable magazine for endless film or tape which may be conveniently utilized with a motion picture projection apparatus or sound recording and playback device utilizing a plurality of radially disposed tapered rollers for supporting and feeding the film during operation.

A further object of the invention is the provision of an endless film feeding apparatus and interchangeable film magazine in which the feeding apparatus utilizes tapered rollers for supporting and feeding the film and in which a novel drive mechanism for such rollers is provided.

A still further object of the invention is the provision of an interchangeable film or tape magazine which may be utilized to receive and support an endless coil of film or tape and in which such film or tape may be installed therein in one piece without necessitating cutting or severing of the film and subsequent splicing thereof.

A further object of the invention is the provision of an interchangeable film or tape magazine which may be utilized with existing motion picture projecting or sound recording and playback apparatus without necessitating modification of such apparatus and which will in no way interfere with the normal operation of the film or tape feeding mechanism incorporated in such apparatus.

Further objects and advantages of the invention will be apparent from the following description taken in conjunction with the accompanying drawings wherein:

Fig. 1 is a top plan view of one form of housing and interchangeable magazine for an endless film or tape and showing in dotted lines the path followed by a loop of such film of tape and the manner of retaining such loop prior to installation in the projection or sound apparatus;

Fig. 2 a side elevational view of the magazine shown in Fig. 1;

Fig. 3 a sectional view taken substantially on the line 3—3 of Fig. 1 and showing the manner of installation and cooperation between the film magazine and the film feeding turntable;

Fig. 4 a top plan view with the magazine top plate removed and showing the film supporting arms in place in the grooves on the film supporting and driving turntable;

Fig. 5 a top plan view of a slightly modified form of housing and interchangeable magazine for use in apparatus having tapered driving rollers for supporting and driving the film during operation;

Fig. 6 a sectional view taken substantially on the line 6—6 of Fig. 5;

Fig. 7 a top plan view of the film supporting and drive mechanism utilizing radially disposed tapered rollers for supporting and driving the film;

Fig. 8 a top plan view of a further modified form of interchangeable magazine for endless film or tape and showing the film supporting arms in film releasing position; and Fig. 9 a side elevational view of the magazine shown in Fig. 8 assembled in a motion picture projection or sound recording and playback apparatus and further showing the relationship of the film supporting arms to the film drive mechanism.

With continued reference to the drawings and particularly Figs. 1 to 4, there is shown a housing and interchangeable film magazine constructed in accordance with this invention and in which the housing and film magazine 10 may well comprise a top wall or plate 11 and a peripheral sidewall 12 depending from the top plate adjacent the outer edge thereof. The top plate 11 and sidewall 12 may be formed of transparent plastic, metal or any other suitable material and while the same is shown in the drawing as being octagonal in shape, the same may be circular or any other desired configuration.

The top plate 11 may be provided with a raised central portion 13 and such portion may be reinforced by a plate 14 secured to the lower surface thereof in any desired manner. Depending from the central raised portion 13 of the top plate 11 are an inner annular series of film engaging rollers 15 and such rollers may be provided with a central recess portion 16 which prevents engagement of the rollers with the exposed portion of the film to be carried in the magazine, such film being engaged only at the edges which substantially prevents damage thereto.

Also depending from the top plate 11 of the housing 10 is an outer annular series of film engaging rollers 17 and these rollers are also undercut, as shown at 18, in order to prevent damage to the film engaged thereby. The outer rollers 18 are provided with studs 19 projecting upwardly through radial slots 20 in the top plate 11 and the studs 19 threadedly receive thumb nuts 21 for adjustably securing the outer rollers 18 in position on the top plate 11 in such a manner as to accommodate coils of film of different sizes.

A hollow hub 22 depends from the top plate 11 and is rotatably mounted centrally thereof by means of an inwardly extending annular flange 23 rotatably engaging a nut 24 which in turn is secured to the top plate 11 by screw threaded fastening means or the like 25 which engages a cup or spring washer 26 to prevent loosening of the fastening means 25 during rotation of the hub 22. Extending radially outwardly from the lower end of the hub 22 are a plurality of film supporting arms 27 which extend outwardly below the lower ends of the inner film engaging rollers 15 and the outer film engaging rollers 17. Also depending from the top plate 11 of the housing 10 is a film engaging roller 28 the purpose and operation of which will be later described.

The film feeding or driving apparatus of the motion picture projector or sound recording and playback device may well comprise a base plate 29 having an upwardly extending spindle 30 on which is rotatably mounted a turntable 31 having a flat upper film engaging and supporting surface 32. The turntable 31 may be driven in any desired manner, but such turntables are commonly driven by a friction wheel, not shown, projecting through an opening 33 in the sidewall 12 of the housing 10 and engaging the rim 34 of the turntable 31. Centrally of the turntable 31 there is provided a recess 35 for receiving the lower end of the hub 22 and projecting radially outwardly from the recess 35 are a plurality of grooves 36 in the upper surface 32 of the turntable 31, such grooves 36 corresponding in number with the number of film supporting arms 27 carried by the hub 22.

In operation, a coil of film or tape is disposed on the film supporting arms 27 between the inner rollers 15 and the outer rollers 17 and a loop 37 of such film is disposed outwardly of the housing 10 with one run 38 of the loop 37 passing inwardly of the housing 10 through an arcuate aperture 39 in the top plate 11 to the inner circumference of the coil of film and the other run 40 of the film loop 37 passing inwardly through an opening in the sidewall 12 of the housing 10 and around the roller 28 to the outer circumference of the coil of film. In order to prevent damage to the film loop 37 or entanglement of the same with surrounding objects there may be provided on the upper surface of the top plate 11 of the housing 10 an upstanding cup 41 open at the top and being provided with a slot 42 in the sidewall thereof for receiving the film loop 37 as clearly shown in Fig. 1, and with the runs 38 and 40 of such film loop passing through the slot 42. In this manner the film loop 37 is retained in position until such time as it is desired to thread the film loop through a motion picture projection apparatus or through the recording and playback head of the sound recording and playback device. The coil of film may be retained in the housing 10 and stored or transported until such time as it is desired to install the same in a motion picture projection or other apparatus, at which time the housing 10 is placed in position over the turntable 31 and moved downwardly to position the film supporting arms 27 in the grooves 36 in the upper surface of the turntable 31. The grooves 36 are of sufficient depth to allow the arms 27 to move below the upper surface 32 of the turntable 31 thereby disposing the coil of film on the upper surface 32 of the turntable 31 and after proper threading of the film loop 37 through the motion picture projection or other apparatus, the turntable 31 may be rotated to drive and feed the film due to the frictional engagement thereof with the upper surface 32 of the turntable 31 and the arms 27 will rotate with the turntable, but will not in any way interfere with the proper feeding of the film. The coil of film will be guided during rotation thereof by the inner film engaging rollers 15 and by the outer film engaging rollers 17 and the housing 10 may be secured in place over the turntable 31 in operative position by means of a plurality of thumb screws 43 passing through the top plate 11 and threadedly engaging pillars 44 projecting upwardly from the base plate 29.

When it is desired to remove the film from the apparatus or to change the same, it is only necessary to remove the thumb screws 43 and lift the entire housing 10 upwardly from the turntable 31, at which time the arms 27 will engage the coil of film and lift the same from the turntable 31 to be retained within the housing 10 until further use thereof.

It will thus be seen that by the above described form of the invention there has been provided a housing and interchangeable magazine for endless films or sound tapes which may be utilized with apparatus incorporating a conventional turntable drive or feed for the film and in which it is only necessary to modify the turntable to accommodate the film supporting arms and hub in order to permit application of the apparatus of this invention thereto.

A modified form of the invention is shown in Figs. 5, 6 and 7 and this form may well include a base plate 45 having an upstanding bearing boss 46 carried thereby. An annular rack 47 is provided on the upper end of the bearing boss 46 and mounted for rotation on the bearing boss 46 is a turntable 48 provided with a hub 49 rotatably mounted on the bearing boss 46. Rotatably mounted on the turntable 48 are a plurality of radially extending horizontally disposed film supporting and driving rollers 50 and as clearly shown in Fig. 6, each of these rollers 50 is provided with a shaft 51 mounted at one end in an antifriction bearing 52 carried by a bracket 53 mounted on the turntable 48 and the inner end 54 of the shaft 51 extends through an anti-friction bearing 55 mounted in the hub 49 of the turntable 48 and provided on the inner end of the shaft 54 is a pinion 56 meshing with the rack 47 on the bearing boss 46. As a result of this arrangement, it will be seen that upon rotation of the turntable 48 about the bearing boss 46, the rollers 50 will be carried thereby and at the same time, due to the engagement of the pinions 56 with the rack 47 will rotate about their own axes for the purpose of feeding the film in a manner to be later described. It is further to be noted, that the film engaging surface of the rollers 50 is tapered, as shown at 57 and the purpose of such tapered surface is to provide a substantially constant drive ratio between the rollers 50 and a coil of film supported thereby, which tapered surface compensates for the changing diameter of the coil of film which is in contact with the roller surface 57.

The film housing and interchangeable magazine 58 for use with this form of the invention may well comprise a top plate 59 and a depending peripheral sidewall 60, the top plate 59 being provided with a raised central portion 61 which may be reinforced by a plate 62 secured to the lower surface thereof, as described above in connection with the first form of the invention. An annular series of inner film engaging rollers 63 depend from the raised portion 62 of the top plate 59 and an outer annular series of film engaging rollers 64 are provided with studs 65 projecting upwardly through radial slots 66 in the top plate 59 and threadedly engaging the studs 65 are thumb nuts 67 which serve to clamp the outer film engaging rollers 64 in adjusted position in accordance with the diameter of a coil of film disposed within the housing 58 between the inner rollers 63 and the outer rollers 64.

A depending sleeve 68 may be rotatably mounted by an anti-friction bearing 69 on the top plate 59 with the bearing 69 being secured thereto by suitable screw threaded fastening means 70 extending through a cup or sring washer 71 and threadedly received in the anti-friction bearing 69. However, other suitable rotatable mounting means for the sleeve 68 may be provided if desired. Extending radially outwardly from the sleeve 68 adjacent the lower end thereof are a plurality of film supporting arms 72 and the purpose and operation of such arms will be presently described. Also depending from the top plate 59 of the housing 58 is a roller 73, the purpose of which will be later described.

In operation, a coil of film is disposed in the housing 58 between the inner rollers 63 and the outer rollers 64 with the film coil supported on the radially extending arms 72. A loop of such film coil extends outwardly of the housing 58 with one run of such loop extending through an arcuate aperture 74 in the top plate 59 and with the other run of the film loop engaging the roller 73 and extending outwardly through an opening in the sidewall 60 of the housing 58. The outer end of the film loop may if desired, be retained in a cup shaped receptacle as described above in connection with the first form of the invention.

When it is desired to install the film magazine and coil of film carried thereby in a motion picture projection or other apparatus, it is only necessary to position the housing 58 over the turntable 48 and upon movement of the housing 58 downwardly the sleeve 68 will be received over an upstanding spindle 75 mounted on the bearing boss 46 and the film supporting arms 72 will be received in radial grooves 76 in the upper end of the hub 49 of the turntable 48. The depth of the groove 76 is sufficient to permit the arms 72 to move downwardly between adjacent film supporting and driving rollers 50 until such time as the lower edge of the coil of film will be disposed on the tapered film engaging surface 57 of the rollers 50.

Thereafter, upon driving of the turntable 48, the rollers 50 will also be driven thereby and will in turn through frictional engagement, drive the coil of film to feed the same to the motion picture projection or other apparatus.

The film housing and magazine 58 may be secured in operative position over the turntable 48 by means of thumb screws 77 passing through the top plate 59 and threadedly engaging pillars 78 projecting upwardly from the base plate 45.

When it is desired to remove the film housing and magazine 58, together with the film contained therein from the apparatus, it is only necessary to remove the thumb screws 77 after which the housing and magazine 58 may be lifted upwardly whereupon the arms 72 will again engage the coil of film to support the same in the housing 58 until such time as it is desired to again utilize the film carried thereby. The above described form of the invention provides a substantially constant speed drive for the coil of film and also provides a convenient and practical housing and interchangeable magazine for the film. The film is maintained in a safe orderly condition during periods of non-use and may be immediately installed in the desired projection or other apparatus by a minimum of manipulation and without requiring any particular skill.

A still further form of the invention which may be utilized in conventional projection or other apparatus without modifying the film feeding or driving mechanism is shown in Figs. 8 and 9 and may well comprise a plate 79 of any desired configuration, which plate is to be mounted on pillars 80 projecting upwardly from a base plate 81 which also serves to rotatably mount a a film driving or feeding turntable 82. The plate 79 may be secured in place on the pillars 80 by means of thumb screws 83 passing through the plate 79 and threadedly engaging the pillars 80.

Depending from the plate 79 is an inner annular series of film engaging rollers 84 and also depending from the plate 79 is an outer annular series of film engaging rollers 85 which may be provided with threaded studs 86 projecting upwardly through radial slots 87 in the plate 79 and threadedly received on the studs 86 are thumb nuts 88 which may be utilized to clamp the outer rollers 85 in adjusted position on the plate 79.

Also depending from the plate 79 adjacent the outer edge thereof and in angularly spaced relation are a plurality of bushings 89 and extending through each bushing 89 and rotatably received therein is a vertical shaft 90 to the lower end of which is attached a film supporting arm 91. Each film supporting arm 91 is tapered at the inner end 92 and also each arm 91 is curved as shown in Fig. 8, with such curvature being at least equal to the radius of the turntable 82.

The upper end of each shaft 90 is provided with a finger engaging knob 93 and provided on the knob 93 and bushing 89 are interengaging detent means 94 which serves to limit movement of the arms 91 between an inner film supporting position, as shown in dotted lines in Fig. 8 and an outer film releasing position as shown in full lines in Fig. 8. In order to retain the detent means 94 in engagement, there may be provided a compression spring 95 which serves to yieldably urge the shaft 90 and finger engaging knob 93 downwardly, as clearly shown in Fig. 9.

A slot 96 is provided in the plate 79 and projects inwardly from the outer edge thereof to an enlarged elongated opening 97 disposed adjacent the inner film engaging rollers 84. The purpose of the slot 96 is to permit installation of an endless coil of film in the interchangeable magazine of this invention without necessitating severing or cutting of the film which also eliminates the necessity of a splicing operation after installation of the film coil in the magazine.

In operation, the film supporting arms 91 are disposed in the full line position, as shown in Fig. 8, and an endless coil of film disposed below the plate 79 between the inner film engaging rollers 84 and the outer film engaging rollers 85. The film supporting arms 91 are then moved inwardly, as shown by the dotted arrows in Fig. 8 and to the dotted line position shown in this figure by manipulation of the finger engaging knobs 93 at which time the film coil will be supported on the arms 91. One run of a loop of such film may be passed through the slot 96 to the enlarged elongated opening 97 and the other run of the film will pass under the outer edge of the plate 79 to the coil retained therebeneath.

The plate 79, together with the film coil carried thereby may be moved downwardly over the turntable 82 and just prior to contact of the film supporting arms 91 with the turntable 82, such arms may be moved to the film releasing full line position shown in Fig. 8, to release the coil of film and deposit the same on the upper surface of the turntable 82. Thereafter, the plate 79 may be moved downwardly to operative position, as shown in Fig. 9, at which time the film supporting arms 91 are disposed below the level of the turntable 82 thereby preventing inadvertent engagement of the arms 91 with the film during feeding thereof by rotation of the turntable 82. When it is desired to remove the film from the turntable 82, it is only necessary to raise the plate 79 until the arms 91 are disposed in the plane of the upper surface of the turntable 82 at which time arms 91 may be moved inwardly by manipulation of the finger engaging knobs 93, at which time the tapered inner ends 92 of the arms 91 will pass beneath the coil of film disposed on the turntable 82 and transfer the same to the arms 91. Thereafter, continued upward movement of the plate 79 will serve to raise the film entirely away from the turntable 82 and the same may be retained on the plate 79 by the supporting arms 91 for future use.

It will be seen that the form of the invention shown in Figs. 8 and 9 and described above is extremely simple and may be utilized without modification of the film engaging and driving means and furthermore, this form of the invention will serve to retain the film in proper condition during periods of non-use.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. For use with a film feeding apparatus including a horizontal turntable having radial grooves in the upper surface and means to drive the turntable, a housing and interchangeable film magazine comprising a top plate, a peripheral sidewall depending from said top plate for surrounding said turntable when said magazine is in operative position, a centrally located depending hub rotatably mounted on said plate, film supporting arms extending radially outwardly from the lower end of said hub, a central recess in the upper surface of said turntable for receiving the lower end of said hub with said arms disposed in said grooves below the upper surface of said turntable when said magazine is in operative position, an inner annular series of film engaging rollers depending from said plate, an outer annular series of film engaging rollers depending from said plate and mounted for radial adjustment thereon, an arcuate aperture in said plate adjacent said inner rollers, an opening in said sidewall, an upwardly opening cup on said plate adjacent the outer edge and a slot open at the upper end in the sidewall of said cup whereby an endless coil of film may be disposed between said inner and outer rollers and supported on said arms with a coiled loop of said film disposed in said cup and extending through said slot with opposite runs of said loop passing through said aperture and said opening, and upon placing said magazine in operative position over said turntable said arms will be received in said grooves with said coil of film supported on said turntable to be driven thereby and feed said film.

2. For use with a film feeding apparatus including a horizontal turntable having radial grooves in the upper surface and means to drive the turntable, a housing and interchangeable film magazine comprising a top plate, a peripheral sidewall depending from said top plate for surrounding said turntable when said magazine is in operative position, a depending hub rotatably mounted on said plate, film supporting arms extending radially outwardly from the lower end of said hub, a central recess in the upper surface of said turntable for receiving the lower end of said hub with said arms disposed in said grooves below the upper surface of said turntable when said magazine is in operative position, an inner annular series of film engaging rollers depending from said plate, an outer annular series of film engaging rollers depending from said plate and mounted for radial adjustment thereon, an aperture in said plate adjacent said inner rollers, an opening in said sidewall, an upwardly opening cup on said plate adjacent the outer edge and a slot open at the upper end in the sidewall of said cup whereby an endless coil of film may be disposed between said inner and outer rollers and supported on said arms with a coiled loop of said film disposed in said cup and extending through said slot with opposite runs of said loop passing through said aperture and said opening, and upon placing said magazine in operative position over said turntable said arms will be received in said grooves with said coil of film supported on said turntable to be driven thereby and feed said film.

3. For use with a film feeding apparatus including a horizontal turntable having radial grooves in the upper surface and means to drive the turntable, a housing and interchangeable film magazine comprising a top plate, a peripheral sidewall depending from said top plate for surrounding said turntable when said magazine is in operative position, a depending hub rotatably mounted on said plate, film supporting arms extending radially outwardly from the lower end of said hub, a central recess in the upper surface of said turntable for receiving the lower end of said hub with said arms disposed in said grooves below the upper surface of said turntable when said magazine is in operative position, an inner annular series of film engaging rollers depending from said plate, an outer annular series of film engaging rollers depending from said plate, an aperture in said plate adjacent said inner rollers and an opening in said sidewall whereby an endless coil of film may be disposed between said inner and outer rollers and supported on said arms with opposite runs of a loop of said film passing through said aperture and said opening, and upon placing said magazine in operative position over said turntable said arms will be received in said grooves with said coil of film supported on said turntable to be driven thereby and feed said film.

4. For use with a film feeding apparatus including a horizontal turntable having radial grooves in the upper surface and means to drive the turntable, a housing and inter-changeable film magazine comprising a top plate, a peripheral sidewall depending from said top plate for surrounding said turntable when said magazine is in operative position, a depending hub rotatably mounted on said plate, film supporting arms extending radially outwardly from said hub with said arms disposed in said grooves below the upper surface of said turntable when said magazine is in operative position, an inner annular series of film engaging rollers depending from said plate, an outer annular series of film engaging rollers depending from said plate, an aperture in said plate adjacent said inner rollers and an inner opening in said sidewall whereby an endless coil of film may be disposed between said inner and outer rollers and supported on said arms with opposite runs of a loop of said film passing through said aperture and said opening, and upon placing said magazine in operative position over said turntable said arms will be received in said grooves with said coil of film supported on said turntable to be driven thereby and feed said film.

5. For use with a film feeding apparatus including a horizontal turntable having radial grooves in the upper surface and means to drive the turntable, an interchangeable film magazine comprising a top plate, a depending hub rotatably mounted on said plate, film supporting arms extending radially outwardly from said hub with said arms disposed in said grooves below the upper surface of said turntable when said magazine is in operative position, an inner annular series of film engaging rollers depending from said plate, an outer annular series of film engaging rollers depending from said plate and an aperture in said plate adjacent said inner rollers whereby an endless coil of film may be disposed between said inner and outer rollers and supported on said arms with one run of a loop of said film passing through said aperture, and upon placing said magazine in operative position over said turntable said arms will be received in said grooves with said coil of film supported on said turntable to be driven thereby and feed said film.

References Cited in the file of this patent

UNITED STATES PATENTS

| | | |
|---|---|---|
| 1,716,774 | Halla | June 11, 1929 |
| 2,003,510 | King et al. | June 4, 1935 |
| 2,363,403 | Napoli | Nov. 21, 1944 |
| 2,837,332 | Busch | June 3, 1958 |

FOREIGN PATENTS

| | | |
|---|---|---|
| 321,551 | Germany | June 7, 1920 |